United States Patent [19]

Maerz

[11] Patent Number: 4,787,690
[45] Date of Patent: Nov. 29, 1988

[54] CUT-OFF FILTER FOR INTEGRATED OPTICS

[75] Inventor: Reinhard Maerz, Munich, Fed. Rep. of Germany

[73] Assignee: Siemens Aktiengesellschaft, Berlin and Munich, Fed. Rep. of Germany

[21] Appl. No.: 26,268

[22] Filed: Mar. 16, 1987

[30] Foreign Application Priority Data

Mar. 24, 1986 [DE] Fed. Rep. of Germany ....... 3609891

[51] Int. Cl.$^4$ .............................................. G02B 27/42
[52] U.S. Cl. ............................ 350/96.12; 350/96.19; 350/162.2; 350/162.23
[58] Field of Search ............... 350/96.11, 96.12, 96.13, 350/96.15, 96.19, 162.17, 162.2, 162.23

[56] References Cited

U.S. PATENT DOCUMENTS

| | | | |
|---|---|---|---|
| 3,891,302 | 6/1975 | Dabby et al. | 350/96.19 |
| 4,441,181 | 4/1984 | Winzer et al. | 350/96.19 X |
| 4,466,694 | 8/1984 | MacDonald | 350/96.19 |
| 4,636,031 | 1/1987 | Schmadel, Jr. et al. | 350/96.19 |
| 4,670,093 | 6/1987 | Maerz et al. | 156/649 |
| 4,707,059 | 11/1987 | Ogura et al. | 350/96.13 |

OTHER PUBLICATIONS

Cross et al., "Sidelobe Suppression in Corrugated-Waveguide Filters," *Optics Letters*, vol. 1, No. 1, Jul. 1977, pp. 43–45.
Kim et al., "Tunable Narrow-Band Thin-Film Waveguide Grating Filters," *IEEE Journ. of Quantum Electr.*, vol. QE-15, No. 12, Dec. 1979, pp. 1405–1408.
Mahlein, "Wavelength-Selective Beam Splitters with Minimum Polarizing Effects for Wavelength-Division Multiplexing in Optical Communication Systems" *Optica Acta*, 1981, vol. 28, No. 1, pp. 28–41.
Yariv, "Propagation, Modulation, and Oscillation in Optical Dielectric Waveguides" *Quantum Electronics*, Second Edition, John Wiley & Sons, 1975, pp. 508–544.
Hall et al., "Edge Coupling of a GaAlAs DH Laser Diode to a Planar Ti:LINbO$_3$ Waveguide" *Applied Optics*, vol. 19, No. 11, Jun. 1, 1980, pp. 1847–1852.

Primary Examiner—John D. Lee

[57] ABSTRACT

A cut-off filter for integrated optics, which filter has a form of a relief-like surface grating on a film or strip waveguide, is formed in a portion of the strip waveguide having a reduced layer thickness and is formed with a constant corrugation depth. Preferably, the formation of the grating is done in a simple way by simultaneously etching a depression in the strip waveguide and also etching the grating structure onto the floor of the depression with the assistance of anisotropically acting etchants.

14 Claims, 2 Drawing Sheets

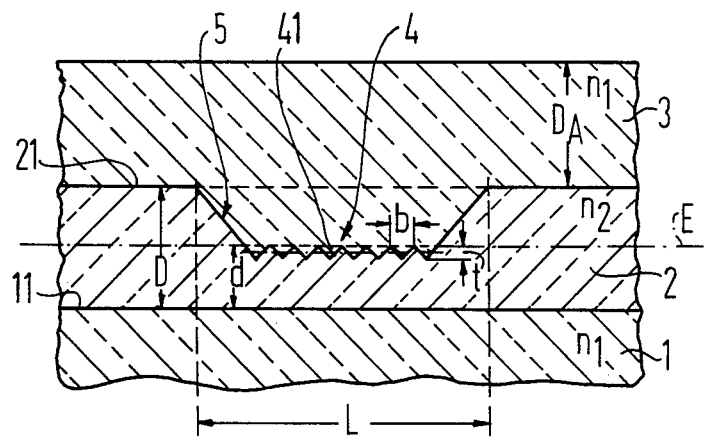
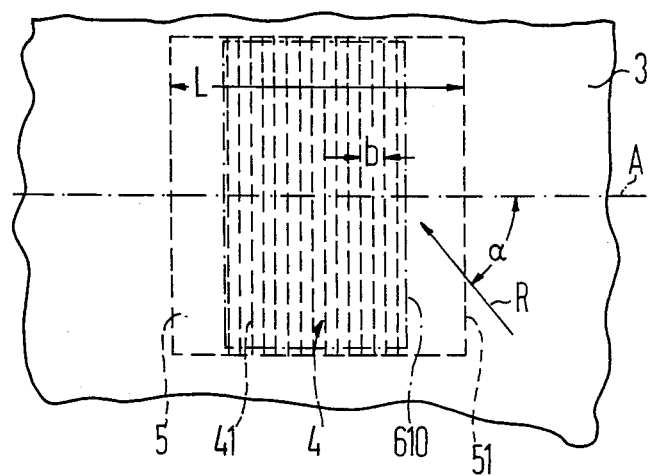

CUT-OFF FILTER FOR INTEGRATED OPTICS

BACKGROUND OF THE INVENTION

Field of the Invention

The present invention is directed to a cut-off filter for integrated optics, which filter is formed as a relief-like surface grating on a film or strip waveguide and to a method of forming the filter.

What is to be understood hereinafter by the term "a cut-off filter" of this type is that it is a filter that exhibits a better sidelobe suppression when compared to a filter in the form of a relief-like surface grating having a constant corrugation depth and period on a film or strip waveguide of a uniform layer thickness.

A cut-off filter of this type is disclosed in an article by P. S. Cross and H. Kogelink, "Sidelobe Suppression in Corrugated Waveguide Filters", *Optics Letter,* 1 (1977), pp. 43 ff. In this filter, the improved sidelobe suppression is achieved by a variation of the corrugation depth and period of the grating in accordance with the prescribed mathematical function. Suitable functions are also specified.

Cut-off filters of this type come into consideration for integrated optical waveguide division multiplex circuits for optical communications (see page 43, first column, paragraph 1 of the above-cited article).

SUMMARY OF THE INVENTION

An object of the present invention is to provide an easily manufactured cut-off filter of the type comprising a relief-like surface grating on a film or strip waveguide. The object of the present invention is achieved by an improvement in the cut-off filter for integrated optics in the form of a relief-like surface grating on a film or strip waveguide. The improvements are that the grating is fashioned in the region of a reduced layer thickness of the waveguide and comprises a constant corrugation depth.

In the cut-off filter of the present invention, the cutoff filter properties recited in greater detail above are achieved in that the grating is formed in a region of reduced layer thickness of the waveguide. It is known from the theory of interference filters that cut-off filters can be realized by raising and/or lowering the refractive index of the surrounding media with respect to the filter layers (see *Optica Acta* 28 (1981) 29). The structure of the filter, however, is thereby also of great significance. The invention is based on the perception that due to the formation of the grating in a region of reduced layer thickness of the waveguide, it can be achieved that the effective refractive indexes in the region of the grating are smaller than in the regions proceeding and following the grating, even when it is a filter of the type initially mentioned.

A simple manufacture of the cut-off filter of the invention resides in the fact that a grating having a constant corrugation depth and a region of reduced layer thickness of the waveguide can be manufactured in an especially easy manner and even in one method step as shall be discussed hereinafter.

The grating is preferably formed in a plane and/or in a region of the waveguide having a constant, reduced layer thickness.

It is expedient when the grating extends in the region of reduced layer thickness that is defined by a depression fashioned in the waveguide. The grating is preferably formed on the floor of this depression and the depression preferably comprises an essentially trapezoidal or box-like profile.

In the preferred embodiment of the filter of the invention, the region of the reduced layer thickness which contains the grating in a strip or film waveguide applied on a substrate, is covered with a cover layer of a material whose index of refraction like that of the material of the substrate is lower than the refractive index of the material of the waveguide.

An especially preferred embodiment of the development is fashioned so that the substrate and layer covering the strip or film waveguide is composed of InP and the strip or film waveguide itself is composed of InGaAsP.

In the manufacture of the filter, one advantageously proceeds so that the film or strip waveguide is covered with an etching mask housing a window, a grating structure is formed in the window and is subsequently exposed to an anisotropically acting etchant until the layer thickness of the waveguide has been reduced to the desired value. The grating and the reduction in layer thickness are thereby simultaneously formed and are formed on their own.

The etching mask with the window and the grating structure in the window are preferably generated so that the thin metal layer with the window is applied to the waveguide and a layer of photoresist is then applied to the metal layer, the layer photoresist in the region of the window of the metal layer is exposed with a light pattern corresponding to the grating structure of the grating to be generated and the photoresist is subsequently developed.

The rectangular window of the etching mask is preferably oriented so that the grating lines that occur due to the anisotropic etching process proceed parallel to the lateral edges of the rectangle.

Other advantages and features of the invention will be readily apparent from the following descriptions, drawings and claims.

BRIEF DESCRIPTION OF THE DRAWINGS

FIG. 1 is a cross-sectional view through a cut-off filter in accordance with the present invention with the cross-section extending perpendicular to the grating lines.

FIG. 2 is a plan view of the cut-off filter of FIG. 1;

FIG. 4 being a cross-sectional view showing the photoresist layer being developed to form a grating structure; FIG. 5 being a cross-sectional view of the initially beginning gratings during an early part of the etchings; and FIG. 6 being a cross-sectional view of the gratings being formed along with the depression.

DESCRIPTION OF THE PREFERRED EMBODIMENTS

Figure 3:
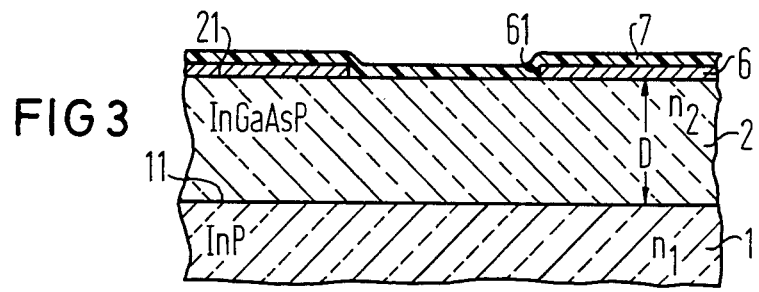
FIGS. 3–6 are cross-sectional views corresponding to FIG. 1 which show various intermediate stages during the process of forming the filter with FIG. 3 being a cross-sectional view of the strip waveguide having the metal etchant mask and the photoresist layer.

The principals of the present invention are particularly useful when incorporated into a cut-off filter of FIG. 1 for a film or strip waveguide 2 which has a reduced layer thickness in certain areas or regions. As illustrated, a waveguide layer 2 of InGaAsP is epitaxially grown on a surface 11 of a substrate 1 of InP. The waveguide is covered by a cover layer 3 which is epitaxially grown InP on a surface 21 of the waveguide. In the region L, the waveguide 2 has a depression 5 in which a normal thickness D of the waveguide is diminished to a small thickness d. This small thickness d in FIG. 1 is equal to a distance between the substrate surface 11 and a plane E which extends parallel to the surface 11. This plane E defines a floor of the depression 5 in which a relief-like surface grating 4 is fashioned. The grid lines of the grating 4 are defined by furrows 41 formed in the floor of the depression which extend perpendicular to the plane of the drawing and have an essentially triangular profile. The furrows or corrugations 41 have a depth t which is defined by the distance between the lowest point of the furrow from the plane E and is the same for all furrows of the grating.

In a plan view of FIG. 2 of the cut-off filter, a grating axis A proceeds perpendicular to the furrows 41 and parallel to a plane E of FIG. 1. Rays of light having a defined wavelength λ are guided in the waveguide 2 in a direction R in the plane E and impinge on the grating 4 at an angle of incidence α. Broken line 51 shows a rim of the depression 5 whereas the dot-dash lines 610 indicate an edge of a window 61 FIG. 3) which determines the spatial extent of the grating 4. This window 61 will be discussed in greater detail hereinafter.

As an example, let us consider a grating 4 having triangular furrow profiles given an angle incidence of $\alpha = 60°$ for a wavelength $\lambda = 1500$ nm. The thickness $D_A$ of the cover layer 3 of the InP is selected to be 2 μm. Given this thickness $D_A$, the maximum value of the thickness D of the waveguide 2 at which the latter is still transversely monomode is 0.9 μm. The reduced thickness d of the waveguide 2 in the region of the grating 4 is selected to be 0.25 μm. The corrugation depth t is 0.1 μm and the grating constant b is selected to be $b = 0.5$ μm. The refractive index $n_1$ of the InP material amounts to 3.175 and the refractive index $n_2$ of the InGaAsP material is 3.29. The gap wavelength of the waveguide 2 amounts to 1100 nm.

Given these materials, values and dimensions, the effective refractive index $n_4$ for the $TE_o$ mode assumes the value 3.2513 in the region of the waveguide 2 having the thickness 0.9 μm, which is outside of the grating 4. Whereas in the region of the grating 4, the effective refractive index $n_4$ ranges between 3.1827 and 3.1938.

The insertion losses that occur due to the depression 5 in the waveguide 2 can be generally kept within bounds by a cover layer 3 having a suitable refractive index. A computational investigation shows that insertion losses of 1 to 2 dB can be anticipated given the examples set forth. This investigation also shows that the reflectivity of the grating 4 in the depression 5 for the wavelength λ below 1500 nm decreases more quickly than a comparative filter of the type initially cited wherein the grating is fashioned on a waveguide having a uniform thickness selected equal to the thickness $d = 0.25$ μm. Accordingly, the exemplary cut-off filter realizes a low pass with respect to the wavelengths $\lambda = 1500$ nm.

In addition, the investigation shows that given a required cross-talk attenuation of 20 dB with respect to the optical power, the minimum channel spacing for the exemplary cutoff filter amounts to 30 nm instead of amounting to 45 nm for a comparison filter. Whereas, the width of the stop band for the cut-off filter is even somewhat greater.

The stated results were acquired for TE modes. As a consequence of the cover layer 3 of InP, however, the difference between the effective refractive index for a TM and TE modes are slight so that polarization independent filters are possible.

The cut-off filters of FIGS. 1 and 2 can be manufactured in the following way. The starting point is a substrate 1 of InP on whose surface 11 the film or strip waveguide 2 is grown in the form of a layer of InGaAsP having a thickness D, i.e., a thickness that is desired later outside of the grating 4. A thin metal layer 6 of, for example, gold, is applied to an exposed surface 21 of the waveguide 2 to a thickness of, for example, about 5 nm. This application can be by sputtering. A photoresist is then whirled onto the metal layer 6. A mask exposure is subsequently carried out and the afore-mentioned window 61 is then etched into the metal layer by a wet chemical etching, for example, with a mixture of 90 g iodine, 200 g potassium iodide and 200 g water.

The grating 4 is later formed in the region of this window 61. The rectangular window 61 is aligned on the surface 21 of the waveguide 2 that is indicated in FIG. 2 with the furrows 41 having triangular profiles and the grating 4, which is formed by a later anisotropic etching process wherein the grating 4 is etched by exposing the (111)-surfaces of InGaAsP crystal, proceed parallel to an edge side of the window 61. In the region of the window 61, this photoresist layer 7 is whirled onto the metal layer and is then exposed with an interference pattern in the form of a grating that is generated, for example, by a laser emission. This grating is composed of parallel like streaks whose grating constant is selected equal to the grating constant b of the later formed grating. After this, the photoresist layer 7 is developed whereupon the structure shown in FIG. 4 will occur. Narrow photoresist strips 71 have remained in the region B of the exposure. These narrow photoresist strips are separated from one another by narrow, strip-shaped interstices 72. Depending on the type of photoresist employed, either the interstices 72 or the photoresist strips 71 can then arise under the light streaks of the interference pattern. The grating constant of the grating structure composed of the photoresist strips 71 is the same as the grating constant b of the grating 4 to be produced.

Figure 4:
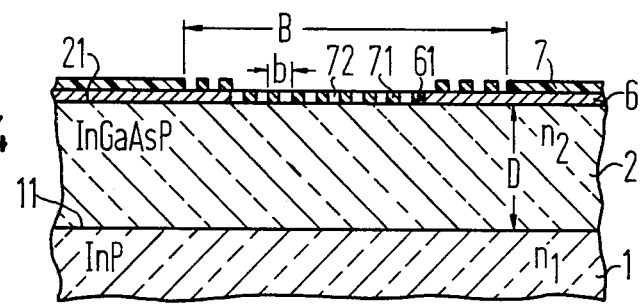

The surface 21 of the waveguide 2 in the interstices 72 in FIG. 4 is subjected in the region of the window 61 with an anisotropically acting etchant and the (111)-surfaces of the crystal structure of the InGaAsP material are laid free. For example, a mixture of ten parts 48% HBr, one part saturated bromine water and forty parts $H_2O$ is suitable.

Figure 5:
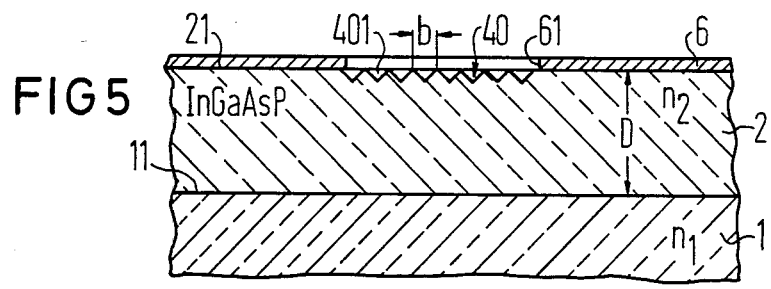

The grating 40 shown in FIG. 5 will occur in the surface 1 of the waveguide 2 as a result of this etching process. The furrows 401 have a V-shaped or triangular profile and the grating constant thereof is equal to b. The strips 71 of the photoresist and the photoresist layer 7 itself must be imagined as having been removed from FIG. 5 even though this is not yet necessary at this point and time.

Figure 6:
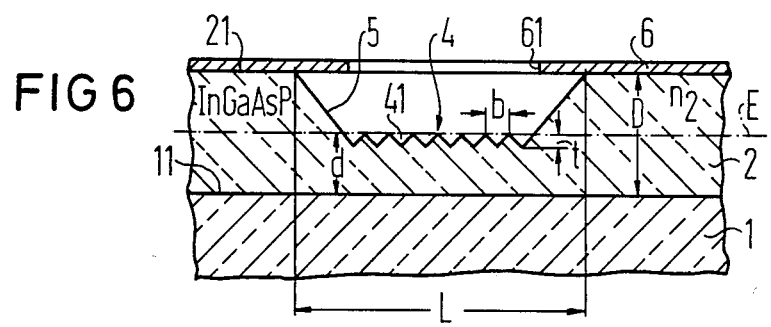

The grating 40 in FIG. 5 is now transferred unmodified into the depth by allowing the etchant to act for a longer period of time. This process occurs on its own and has already been set forth in greater detail in an earlier filed co-pending allowed U.S. patent application, Ser. No. 853,946, filed Apr. 21, 1986, which issued as U.S. Pat. No. 4,670,093 on June 2, 1987 and whose disclosure is incorporated by reference. The metal layer 6 with a window 61 acts as an etching mask during this process. The window 61 determines the spatial extent of the grating to be produced and of the depression that occurs in the waveguide 2. The etchant must act until the grating 40 is lowered into to the predetermined, reduced thickness d where it then forms the grating 4 of FIG. 6, which has V-shaped furrows 41 and this grating is then formed on the floor of the depression 5.

After the metal layer 6 is removed, the layer 3 of InP is epitaxially grown on the waveguide 2 so the structure shown in FIG. 1 will occur. The constant corrugation depth t of the grating 4 decreases slightly in this step.

Although various minor modifications may be suggested by those versed in the art, it should be understood that I wish to employ within the scope of the patent granted hereon all such modifications as reasonably and properly come within the scope of my contribution to the art.

I claim:

1. In a cut-off filter for integrated optics in the form of a relief-like surface grating on a strip waveguide, the improvements comprising said strip waveguide having a region of reduced layer thickness and said grating being fashioned in said region and having a constant corrugation depth.

2. In a filter according to claim 1, wherein the waveguide has a depression formed therein to provide said region and said grating is formed in said depression.

3. In a filter according to claim 2, wherein said grating is formed in the floor of said depression.

4. In a filter according to claim 3, wherein said depression has an essentially trapezoidal cross-section.

5. In a filter according to claim 1, wherein the region of reduced layer thickness is of a constant layer thickness.

6. In a filter according to claim 1, wherein said grating is formed in one plane.

7. In a filter according to claim 1, wherein the strip waveguide is on a substrate and wherein the region of the reduced layer thickness of said waveguide is covered by a cover layer of material, both the material of the cover layer and the material of the substrate having a refractive index lower than the refractive index of said waveguide.

8. In a filter according to claim 7, wherein both the substrate and the cover layer are composed of InP and said waveguide is formed of a layer of InGaAsP.

9. In a filter according to claim 1, wherein the strip waveguide is on a substrate, said region of a reduced thickness being formed by a depression formed in the strip waveguide, said depression having a floor and the grating being formed in the floor of said depression, said depression being filled by a cover layer which covers the strip waveguide.

10. In a filter according to claim 9, wherein the floor of the depression lies in one plane and a reduced layer thickness between the floor of the depression and an upper surface of the substrate is a constant value.

11. In a filter according to claim 9, wherein the material of the strip waveguide is composed of InGaAsP and the materials forming the substrate and the cover layer are formed of InP.

12. A method for manufacturing a cut-off filter in a strip waveguide, said cut-off filter being formed by a grating formed in a floor of a depression in the strip waveguide and having a constant corrugation depth, said method comprising the steps of providing a strip waveguide, providing an etchant mask having a window on an upper surface of the strip waveguide, providing a grating structure in the window, then exposing the etchant mask and grating structure to an anisotropic etching until a layer thickness of the waveguide has been reduced to form the depression having the grating.

13. A method according to claim 12, wherein the step of providing the etchant mask includes applying a thin metal layer on the upper surface of the waveguide, etching a window in the thin metal layer to expose a portion of the upper surface, and wherein the step of providing the grating structure comprises applying a photoresist layer on the metal layer and the exposed portion of the upper surface, exposing the photoresist layer in the region of the window of the etchant mask with a light pattern corresponding to a grating structure of the grating to be generated, and then developing the photoresist layer to form the grating structure.

14. A method according to claim 13, wherein the step of etching a window in the thin metal layer etches a rectangular window and orients the rectangular window so that the grating lines resulting from the anisotropic etching process extend parallel to a lateral edge of the rectangular window.

* * * * *